Patented Feb. 6, 1923.

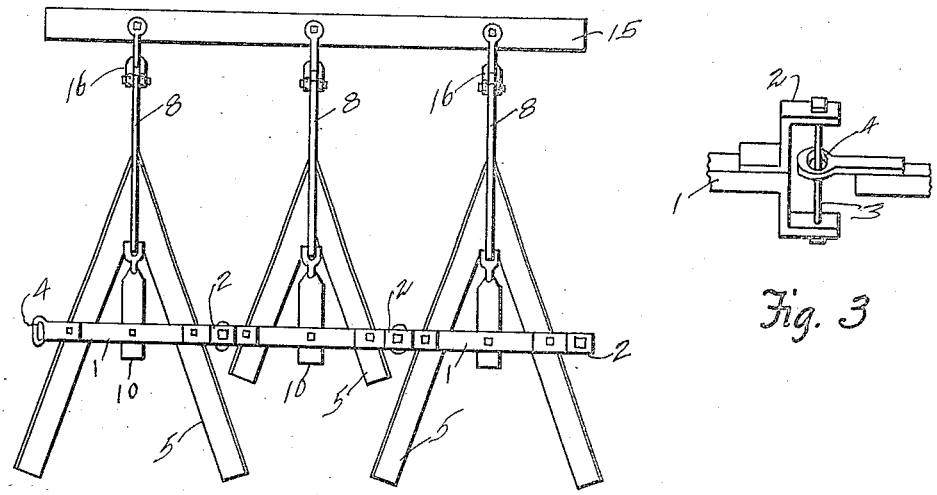
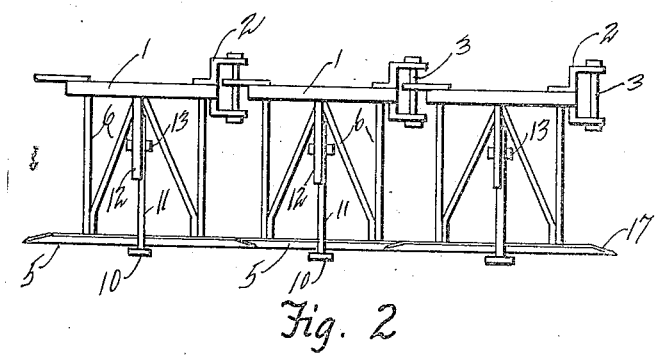
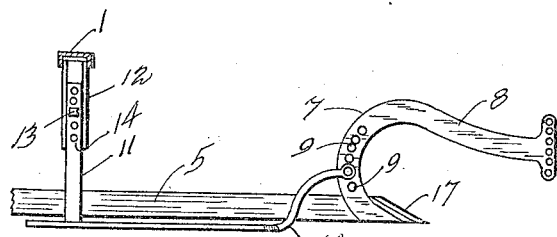

1,444,572

UNITED STATES PATENT OFFICE.

MATHEW THOMASON, OF WALLA WALLA, WASHINGTON.

SELF-CLEANING WEEDER.

Application filed February 5, 1921. Serial No. 442,878.

*To all whom it may concern:*

Be it known that I, MATHEW THOMASON, a citizen of the United States, residing at Walla Walla, in the county of Walla Walla and State of Washington, have invented certain new and useful Improvements in Self-Cleaning Weeders, of which the following is a specification.

This invention relates to agricultural implements of a class for cleaning the soil of weeds and has for its object to provide a means for cutting weeds that is relatively simple to construct, cheap to manufacture, and that is highly efficient in its work.

A further object is to provide a means for cutting weeds that is self-cleaning and hence is continuous in its operation.

A further object is to provide a means for cutting weeds that may be composed of sections, and having a close flexible connection between the sections, by which means the blades will be constantly in proper contact with the soil regardless of its contour.

A further object is to provide a weeder whose supporting means are positioned to travel upon the cleaned soil and thus do not compact the soil ahead of the blades.

A further object is to provide a weeder whose supporting means may be regulated to conform to the requirements of each individual blade.

With these and other objects in view reference is now had to the accompanying drawings, in which—

Fig. 1 is a plan view of three sections of the weeder;

Fig. 2 is a rear end elevation thereof;

Fig. 3 is an enlarged perspective view of a flexible coupling; and

Fig. 4 is an end elevation in section of the blade and frame, and shows the relative position of the various parts.

Having reference to the drawings, like numerals refer to like parts throughout and the numeral 1 refers to the frame which may be of channel iron as shown or of any suitable material.

On one end of the frame is a close flexible connection which consists of a clevis arrangement 2 having the usual bolt 3, and on the other end of the frame is an enlarged eye 4 made therein. The clevis bolt 3 engages the eye of the next frame adjoining and by means of the enlarged eye and the wide jaw of the clevis combined the two form an exceedingly flexible and at the same time close joint at this point.

The frame is rigidly attached to the cutting blade 5 by the braces 6 which are fastened to the blades at a point thereon intermediate their ends and well toward the rear or open end of the V, thus bracing the blades at their weak points and at the same time positioning the frame at the logical point for joining the frames together.

The blades 5 are of the usual material and built in the form of a V; and in the crotch or point of the V is rigidly attached the goose neck 7 which extends to form a drawbar 8 by which the blades are drawn through the soil.

The goose neck 7 is provided with adjusting holes 9 in which the front end of the shoe 10 is fastened by any suitable means to enable proper adjustment.

The shoe 10 is of the usual design, its position and points of adjustment differing in the new and novel manner shown in the drawings and described herein, wherein the forward end is adjustably attached to the gooseneck, or draftbar, and the rearward end adjustably attached to the frame by means of the upright 11, the guide member 12, and the bolt 13 and adjusting holes 14.

An evener 15 joins the sections together at the forward end by means of the clevises 16, the evener being also the means by which the weeder is drawn through the soil as to this is attached the horses or other power.

As will be gathered by the above description the weeder is built in sections with the alternate sections having short or long V shaped blades, with the long blades projecting past the end of the short blades so as to leave no part of the surface of the soil untouched.

In use the weeder is drawn through the ground in the usual manner, the flexible frame permitting sufficient movement of the blades to correspond with the contour of the ground; and by means of the shoe the blade is maintained at its proper depth for its best work.

The blades being set at an incline, as shown at 17, will have a tendency to bury itself in the ground to a degree depending on the nature of the soil and hence the shoe is used to counteract this tendency. The central position of the shoe, while supporting the weeder, eliminates the necessity of two shoes for each section.

The V shaped blades permits the weeds to pass off at the rear ends as the weeder progresses thus being self cleaning.

The draft bar 8 is independently attached to the blade as is also the frame 1, i. e., each is independently attached with respect to the other, and no upper frame-work is used to join these parts as is the usual practice.

Having thus described my invention, I claim—

1. In a self cleaning weeder, a frame, V shaped cutting blades, said frame rigidly and independently attached to said blades intermediate their ends, a draft bar rigidly and independently attached to said blades, and a supporting means for said weeder consisting of a shoe centrally and adjustably attached to said draft bar and to said frame.

2. In a self cleaning weeder, a flexible frame, rigidly and independently attached to and carrying V shaped cutting blades, a draft bar rigidly attached to the point of said cutting blades, and a shoe centrally disposed within the V of said blades and adjustably attached at one end to said draft bar and at the other end to said frame.

3. In a self cleaning weeder, a frame, flexible connections on each end of said frame, V shaped cutting blades attached to said frame, with the points thereof projected forward of said frame, a gooseneck attached to said blades and extended to form a draft bar, a shoe pivotally and adjustably attached to said goose neck, an upright attached to the rear end of said shoe and adjustably supported by said frame.

In testimony whereof I affix my signature.

MATHEW THOMASON.